(No Model.)
F. P. CLARK.
LOCK.
No. 291,686. Patented Jan. 8, 1884.
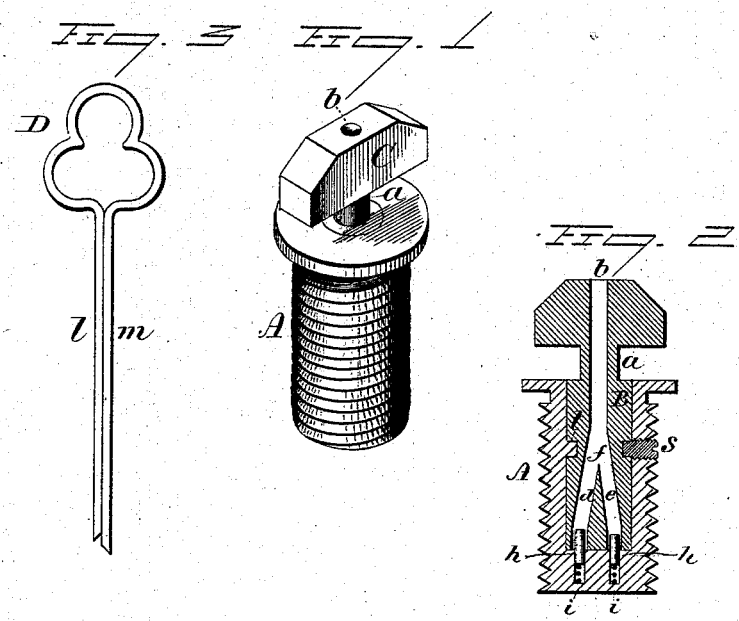
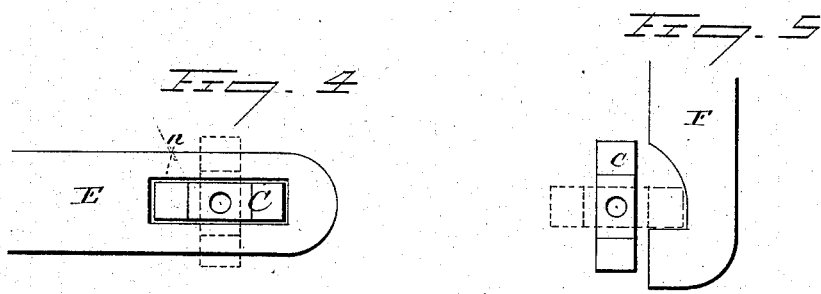
Witnesses.
J. N. Shumway
Jos. C. Earle
Freeman P. Clark
By Atty. Inventor
Wm. Earle

UNITED STATES PATENT OFFICE.

FREEMAN P. CLARK, OF NEW HAVEN, CONNECTICUT.

LOCK.

SPECIFICATION forming part of Letters Patent No. 291,686, dated January 8, 1884.

Application filed October 1, 1883. (No model.)

*To all whom it may concern:*

Be it known that I, FREEMAN P. CLARK, of New Haven, in the county of New Haven and State of Connecticut, have invented a new Improvement in Locks; and I do hereby declare the following, when taken in connection with accompanying drawings and the letters of reference marked thereon, to be a full, clear, and exact description of the same, and which said drawings constitute part of this specification, and represent, in—

Figure 1, a perspective view; Fig. 2, vertical section; Fig. 3, the key; Fig. 4, the lock as applied to a locking-staple; Fig. 5, modification.

This invention relates to an improvement in that class of locks in which the locking device operates as a turn-button—as, for instance, a T-shaped head, upon which a hasp having a slot in its end is placed, the slot passing over the head when it stands in the same plane as the slot, and then, after the slot has passed onto the neck below the head, the head may be turned at right angles to the slot, and thereby prevent the disengagement of the hasp from the lock—but applicable for other purposes, the object being a simple device to lock the head when turned into its locking position, but yet which will be difficult to unlock without the key which is specially fitted to it; and the invention consists in a cylindrical body arranged in a correspondingly-shaped socket, with a key-hole longitudinally through the head and body, the hole divided to turn in two directions from the center, combined with spring-bolts in the socket which will enter the divisions of the hole when in line therewith, so as to lock the body and prevent the head from turning, and a divided elastic key constructed to enter the single hole, and so that the two parts will separate within the body and pass through the respective divisions of the hole to depress the bolts out of engagement with the body, as more fully hereinafter described.

A represents the socket, which is preferably made cylindrical and screw-threaded upon its outside, so that it may be screwed into a round hole bored for the purpose. This socket is constructed with a cylindrical opening, into which fits the cylindrical body B, and so that it may be easily rotated therein. As represented in Figs. 1 and 2, the body terminates in a T-shaped head, C, outside the socket, connected with the body by a neck, *a*. Centrally through the head and into the body is the key-hole *b*. At some point within the body this hole divides into two parts, *d e*, the one turning in one direction and the other in the opposite direction, leaving a sharp or inverted-V-shaped division, *f*, between the two parts of the hole *d e*. These holes *d e* continue through the inner end of the body, and in the socket spring-bolts *h h* are arranged, corresponding to the termination of the holes *d e*. These bolts are fitted with a spring, *i*, below them, the tendency of which is to force the bolts toward the body and into the holes *d e*; and when so engaged the bolts prevent the turning of the body in the socket.

The key (seen in Fig. 2) is made from wire or other suitable material, bent midway of its length to form the head or bow D, the end portions, *l m*, brought together, the two combined corresponding substantially in shape to the hole *b*. At their extreme ends the two parts are beveled, as shown. The key is introduced with the two legs *l m* together, as seen in broken lines, Fig. 2, and pressed inward until they strike the sharp divisons *f*. This causes the one leg, *l*, to turn into the division or hole *d*, and the other leg, *m*, into the division or hole *e*. The length of the two legs *l m* is such that they will strike the two bolts *h h*, and press them into a position within the socket beyond the end of the body B, as seen in broken lines, Fig. 2. In that condition the body may be turned with perfect freedom; but so soon as the key is withdrawn the bolts are free to enter their respective holes whenever the body shall be turned to that position, it being understood that the key is made of elastic material, so as to permit the two parts to spring into the holes *d e* and return to their original condition when withdrawn from the holes.

The lock is applied by boring a hole at the proper place and screwing the socket therein, and if for a hasp, as seen in Fig. 4, E representing the hasp, the slot *n* in the hasp passes over the head C, and then the key being in the lock, so as to permit the body to be turned, it is turned to bring the head into the position indicated in broken lines, Fig. 4. The key withdrawn, the bolts will spring into the holes in the body B and lock it in that position with the head transversely across the slot in the hasp, from which it cannot be removed until the key be reinserted and the bolts depressed.

The length of the bolts may be different the one from the other, and the legs of the key of correspondingly-different lengths, and so that, unless an instrument having such differential legs be introduced, the bolts cannot be depressed to the required extent to clear the body.

If for a trunk-lock, in which a hinged hasp is not desirable, the cover may be provided with a staple, F, having a shoulder, r, upon which, when the cover is closed, the head C may be turned, as seen in broken lines, Fig. 5, to engage that shoulder, and which is the locked position for the head, and so that the cover cannot be lifted until the head be turned from the shoulder r. In this case the head need only project to one side of the body, instead of both, as in the turn-button character hereinbefore described. This modification will be sufficient to illustrate the various purposes to which this lock may be adapted.

The body is best held in the socket by means of a pin or screw, s, inserted through the side of the socket into an annular groove, t, in the body, which will permit the body to turn freely, yet prevent axial or longitudinal movement of it.

I claim—

The combination of the socket A, the cylindrical body B, arranged in said socket free for rotation, but prevented from axial movement, the body constructed with a head, C, to engage the thing to be locked, the longitudinal central hole, b, through the body divided within the body into two parts, d e, bolts h h, corresponding to the divisions of the hole d e, and arranged in the socket with springs the tendency of which is to force the bolts into the holes in the body, and a key constructed with two elastic legs, l m, together corresponding to the key-hole b, and which, when introduced into the hole, will be divided and pass, respectively, into the divisions d e of the hole and upon the bolts h h, substantially as described.

FREEMAN P. CLARK.

Witnesses:
  Jos. C. EARLE,
  J. H. SHUMWAY.